US006985244B1

(12) United States Patent
Bhogal et al.

(10) Patent No.: US 6,985,244 B1
(45) Date of Patent: Jan. 10, 2006

(54) PRINT QUOTAS

(75) Inventors: Kulvir Singh Bhogal, Austin, TX (US); Baljeet Singh Baweja, Austin, TX (US); Nizamudeen Ishmael, Jr., Austin, TX (US); Mandeep Sidhu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 09/692,393

(22) Filed: Oct. 19, 2000

(51) Int. Cl.
*G06F 15/00* (2006.01)
*G06F 15/173* (2006.01)
*B65H 39/10* (2006.01)

(52) U.S. Cl. .................... 358/1.15; 358/1.15; 271/298; 709/226

(58) Field of Classification Search ............... 358/1.15, 358/1.12, 1.11; 709/206, 219; 399/82, 130; 271/298, 296; 710/7, 8
See application file for complete search history.

(56) References Cited

U.S. PATENT DOCUMENTS

| | | | |
|---|---|---|---|
| 3,866,181 A | 2/1975 | Gayman et al. | 340/172.5 |
| 5,200,830 A | 4/1993 | Imaizumi et al. | 358/296 |
| 5,327,526 A | 7/1994 | Nomura et al. | 395/115 |
| 5,574,194 A | 11/1996 | Babin et al. | 568/812 |
| 5,574,831 A | 11/1996 | Grenda | 395/104 |
| 5,579,087 A | 11/1996 | Salgado | 355/202 |
| 5,636,333 A | 6/1997 | Davidson, Jr. et al. | 395/114 |
| 5,787,237 A | 7/1998 | Reilly | 395/112 |
| 5,813,348 A | 9/1998 | Zingher | 101/494 |
| 5,832,301 A | 11/1998 | Yamaguchi | 395/868 |
| 5,847,857 A | 12/1998 | Yajima et al. | 358/468 |
| 5,897,260 A | 4/1999 | Zingher | 400/719 |
| 5,940,582 A | 8/1999 | Akabori et al. | 395/112 |
| 5,982,994 A | 11/1999 | Mori et al. | 395/114 |
| 6,057,930 A | 5/2000 | Blossey et al. | 358/1.15 |
| 6,130,757 A | 10/2000 | Yoshida et al. | 358/1.15 |
| 6,227,531 B1 | 5/2001 | Guerrero et al. | 270/58.31 |
| 6,240,460 B1 * | 5/2001 | Mitsutake et al. | 709/235 |
| 6,504,621 B1 * | 1/2003 | Salgado | 358/1.16 |
| 6,535,297 B1 * | 3/2003 | Steele et al. | 358/1.15 |
| 6,714,971 B2 * | 3/2004 | Motoyama et al. | 709/219 |

FOREIGN PATENT DOCUMENTS

| | | |
|---|---|---|
| JP | 10-187387 | 7/1998 |
| JP | 11-232060 | 8/1999 |
| JP | 11-237962 | 8/1999 |

* cited by examiner

*Primary Examiner*—Kimberly Williams
*Assistant Examiner*—Saeid Ebrahimi-Dehkordy
(74) *Attorney, Agent, or Firm*—Duke W. Yee; Jeffrey S. LaBaw; James O. Skarsten

(57) ABSTRACT

A method for limiting the size of print jobs in a computer network by setting a predetermined quota for the number of pages a network user may print within a specified time period is provided. If a print job submitted by a network user exceeds the print quota, the job will automatically be prevented from printing. If the submitted print job does not exceed the print quota, the job will be allowed to proceed. In one embodiment of the present invention, a network user may request special permission to exceed the print quota, if necessary.

21 Claims, 2 Drawing Sheets

PRINT QUOTAS

BACKGROUND OF THE INVENTION

1. Technical Field

The present invention relates to printing in a network environment. More specifically, the present invention relates to controlling the amount of printing a network user may perform within a specified time period.

2. Description of Related Art

In a computer network environment, network users must often share the same printing resources. In this type of environment, large print jobs can cause considerable problems. If several network users are attempting to use the same printer at roughly the same time, a large print job can delay several smaller, subsequent print jobs. This essentially allows one person to disrupt the work of several people, leading to considerable productivity problems for the entire network. If several people are attempting to print large print jobs, the congestion can become even more severe.

In addition to problems of delay and congestion, large print jobs require considerable resources, such as paper and ink/toner. In addition to the direct financial costs for these resources, there are also environmental concerns related to the production of paper waste.

Since many network users do not directly bear the costs of their large print jobs, there is not much of an incentive to control their own use of the printer resources. Many large print jobs, though convenient for the user, may not be necessary for the user's work, and not worth the costs to network productivity as a whole.

Currently, there is no way for a computer network administrator to limit how many pages a network user may print within a specified time period. Therefore, a method for limiting the amount of printing a network user may perform within a specified time period, while allowing exceptions for necessary jobs, would be desirable.

SUMMARY OF THE INVENTION

The present invention provides a method for limiting the size of print jobs in a computer network by setting a predetermined quota for the number of pages a network user may print within a specified time period. If a print job submitted by a network user exceeds the print quota, the job will automatically be prevented from printing. If the submitted print job does not exceed the print quota, the job will be allowed to proceed. In one embodiment of the present invention, a network user may request special permission to exceed the print quota, if necessary.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
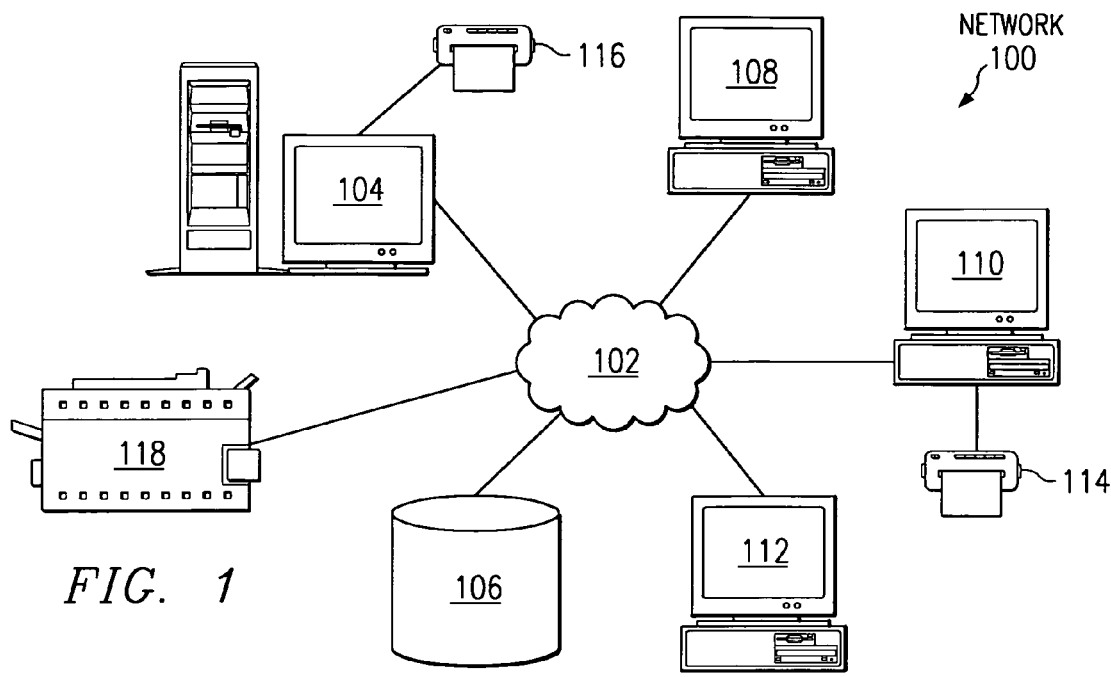
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections. In the depicted example, server 104 is connected to network 102, along with storage unit 106. In addition, clients 108, 110 and 112 are also connected to network 102. These clients, 108, 110 and 112, may be, for example, personal computers or network computers.

For purposes of this application, a network computer is any computer coupled to a network that receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
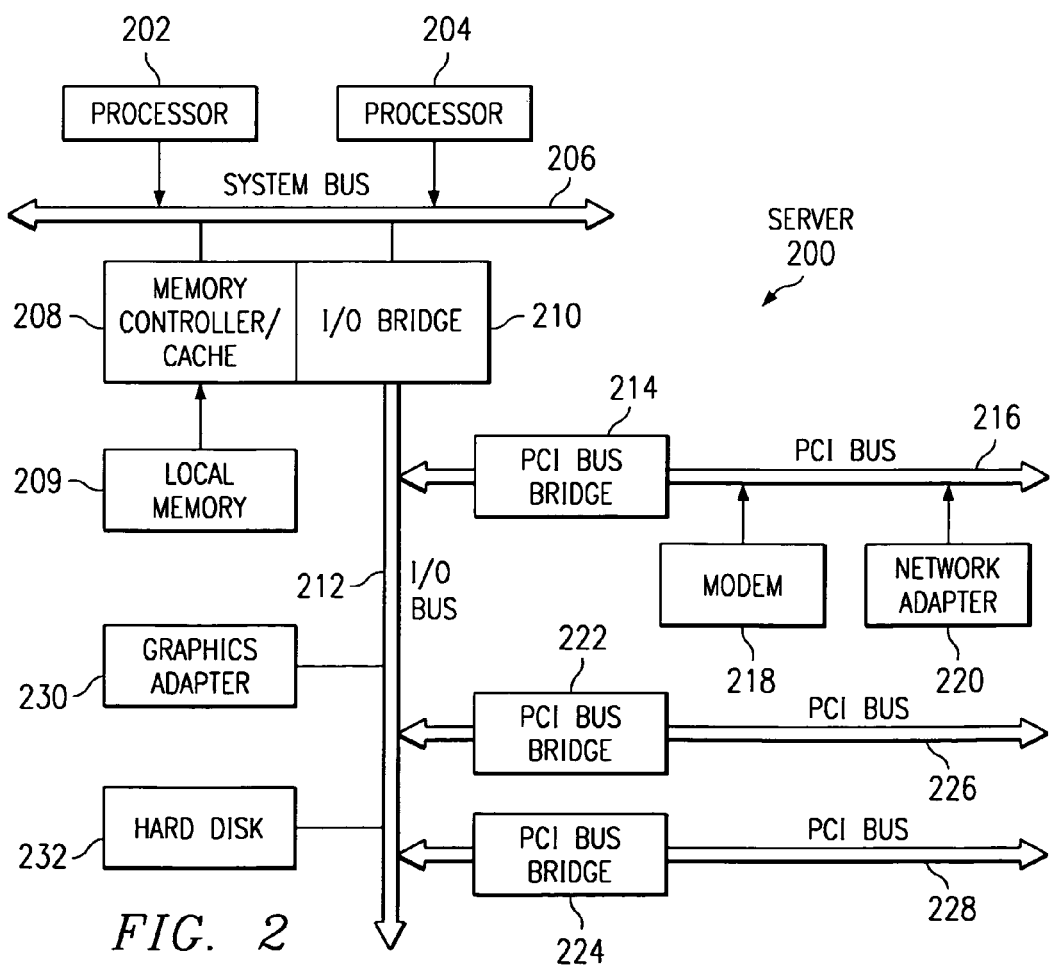
FIG. 2 depicts a block diagram of a data processing system which may be implemented as a server, in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206.

Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

Figure 3:
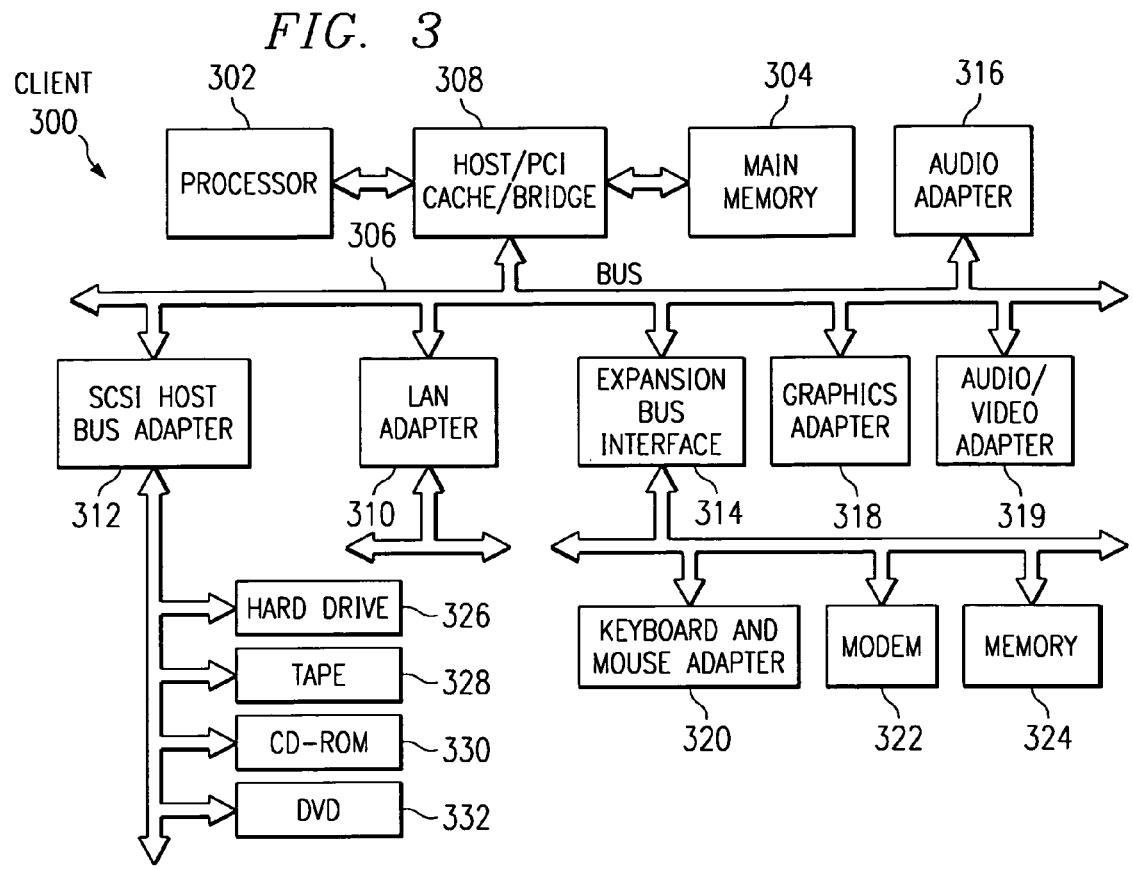
FIG. 3 depicts a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as AIX, which is available from International Business Machines Corporation. "AIX" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
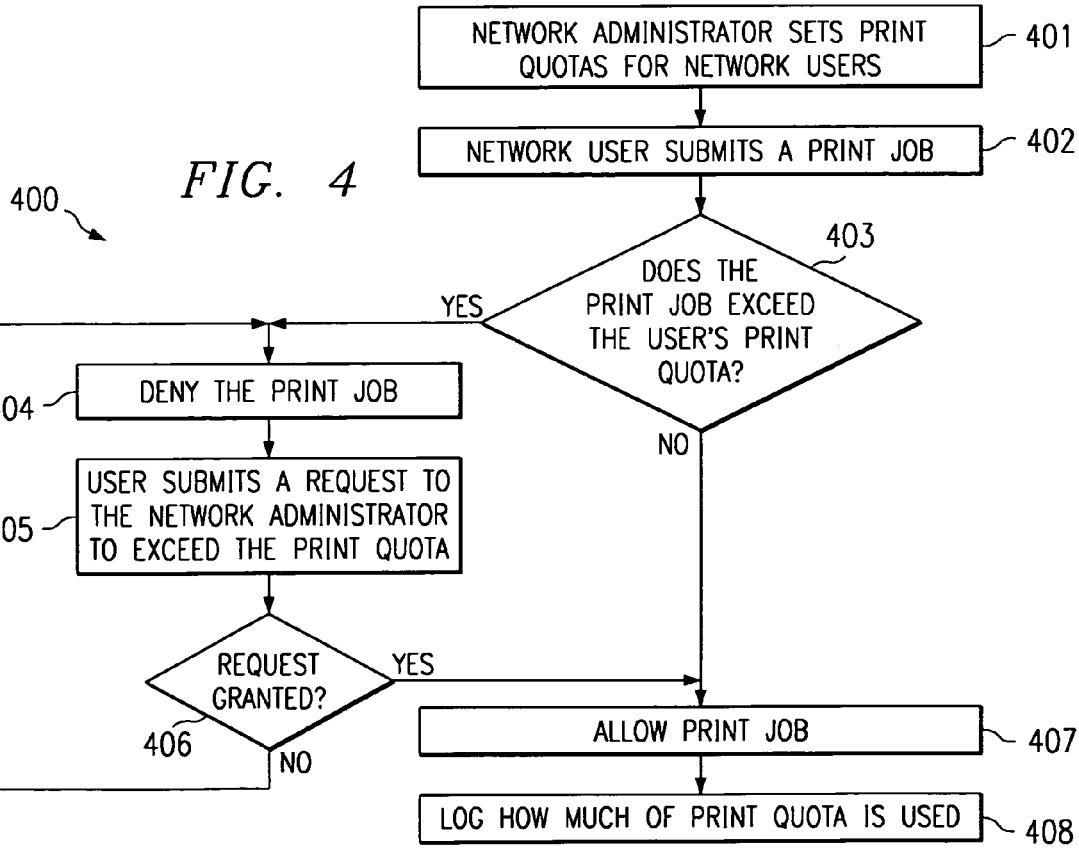
FIG. 4 depicts a flowchart illustrating a method for limiting the number of pages a network user may print within a specified period of time, in accordance with the present invention.

In reference to FIG. 4, a flowchart illustrating a method for limiting the number of pages a network user may print within a specified period of time is depicted in accordance with the present invention. The present invention provides the network administrator with a graphical user interface (GUI), which may be tied into the operating system. This administrative GUI allows the network administrator to set print quotas for network users (step 401). These quotas refer to the number of pages a network user may print within a specified period of time. Both the number of pages and the time period in question may be set by the network administrator. In addition, the administrator may set different print quotas for each network user, or a uniform quota for the entire network, depending on the specific needs of the network. Each user may also have a set of quotas, denoting different time intervals. For example, a user may have a quota for number of pages printed per hour, per day, and per week.

With the print quotas in place, a network user can then submit a print job to one of the network printers, such as, for example, printers 116 or 118 in FIG. 1 (step 402). The next step is to determine if the requested print job exceeds the user's specified print quota for that time period (step 403).

If the requested print job exceeds the user's print quota, the job will be denied and automatically prevented from printing (step 404). If the requested print job does not exceed the user's print quota, the job will be allowed to print (step 407). After printing is completed, the invention logs how much of the user's quota has been used (step 408).

In one embodiment of the present invention, provisions are made for exceeding print quotas when necessary. Taking into account the fact that predetermined quotas will not be able to perfectly anticipate future printing needs, the present invention allows a network user to request special permission to exceed that user's print quota (step 405). This may be accomplished by means of, for example, a dialog box for submitting special requests to the network administrator. It is then up to the administrator to decide whether or not the user may exceed the print quota (step 406). If the administrator denies the special request, the print job in question will not be allowed to print (step 404). If the special request is granted, then the print job will be allowed to print (step 407).

Allowing special permission to exceed print quotas provides needed flexibility that cannot be accomplished with simple bright line rules, but still allows the administrator to minimize printing delays and the waste of limited resources. Special permission to exceed print quotas can also be automated and based on the total network printer use for that time interval, so that network administrators are not constantly bogged down with requests from users. In addition, special permission can be granted preemptively if a user is about to exceed his or her quota and network printer use is low for that time interval. In this way, the delay of having to process a formal request can be avoided.

By logging printer use for each network user in step 408, the network administrator can determine who the heaviest print users are. This information can be used to reign in users who might be wasting resources, or it could be used increase quotas for users with genuinely higher print requirements.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for limiting the size of print jobs in a computer network, comprising:
   setting a predetermined quota for the number of pages a network user is allowed to print within a specified time period;
   receiving a print job request from a network user;
   determining if the print job exceeds the predetermined print quota;
   preventing the print job from printing if it exceeds the predetermined print quota;
   allowing the print job to print if it does not exceed the predetermined print quota, so that network congestion is reduced;
   enabling a user to request special permission to exceed said predetermined print quota; and
   automatically granting special permission to a user to exceed the predetermined print quota, when printer use in said commuter network is comparatively low during said specified time period, said permission being automatically granted either in the absence of a request for said permission or after receiving a request therefor.

2. The method according to claim 1, further comprising logging the amount of the user's print quota, including both the number of pages and the specified time period that is used.

3. The method according to claim 1, when the step of setting a predetermined print quota further comprises setting separate print quotas for different lengths of time.

4. The method according to claim 1, wherein the step of setting a predetermined print quota further comprises setting a single, uniform quota for all network users.

5. The method according to claim 1, wherein the step of setting a predetermined print quota further comprises setting individual print quotas for each network user.

6. The method according to claim 1, wherein a network user may request special permission to exceed the print quota.

7. The method according to claim 6, wherein the process of granting permission to exceed the print quota is automated.

8. A computer program product in a computer readable medium for use in a data processing system for limiting the size of print jobs in a computer network, the computer program product comprising:
   instructions for setting a predetermined quota for the number of pages a network user may print within a specified time period;
   instructions for receiving a print job request from a network user;
   instructions for determining if the print job exceeds the predetermined print quota;
   instructions for preventing the print job from printing if it exceeds the predetermined print quota;
   instructions for allowing the print job to print if it does not exceed the predetermined print quota, so that network congestion is reduced;
   instructions for enabling a user to request special permission to exceed the predetermined print quota; and
   instructions for automatically granting special permission to a user to exceed said predetermined print quota, when printer use in said computer network is comparatively slow during said specified time period, said permission being automatically granted either in the absence of a request for said permission or after receiving a request therefor.

9. The computer program product according to claim 8, further comprising instructions for logging the amount of the user's print quota that is used.

10. The computer program product according to claim 8, wherein the instructions for setting a predetermined print quota further comprise instructions for setting separate print quotas for different lengths of time.

11. The computer program product according to claim 8, wherein the instructions for setting a predetermined print quota further comprise instructions for setting a single, uniform quota for all network users.

12. The computer program product according to claim 8, wherein the instructions for setting a predetermined print quota further comprise instructions for setting individual print quotas for each network user.

13. The computer program product according to claim 8, further comprising instructions for a network user to request special permission to exceed the print quota.

14. The computer program product according to claim 13, wherein the instructions for granting permission to exceed the print quota are automated.

15. A system for limiting the size of print jobs in a computer network, comprising:
   means for setting a predetermined quota for the number of pages a network user may print within a specified time period;

means for receiving a print job request from a network user;

means for determining if the print job exceeds the predetermined print quota;

means for preventing the print job from printing if it exceeds the predetermined print quota;

means for allowing the print job to print if it does not exceed the predetermined print quota, so that network congestion is reduced;

means for enabling a user to request special permission to exceed the predetermined print quota; and means for automatically granting special permission to a user to exceed said predetermined print quota, when printer use in said computer network is comparatively low during said specified time period, said permission being automatically granted either in the absence of a request for said permission or after receiving a request therefor.

16. The system according to claim 15, further comprising means for logging the amount of the user's print quota that is used.

17. The system according to claim 15, wherein the means for setting a predetermined print quota further comprises means for setting separate print quotas for different lengths of time.

18. The system according to claim 15, wherein the means for setting a predetermined print quota further comprises means for setting a single, uniform quota for all network users.

19. The system according to claim 15, wherein the means for setting a predetermined print quota further comprises means for setting individual print quotas for each network user.

20. The system according to claim 15, further comprising means for a network user to request special permission to exceed the print quota.

21. The system according to claim 16, wherein the means for granting permission to exceed the print quota is automated.

* * * * *